Patented Feb. 10, 1942

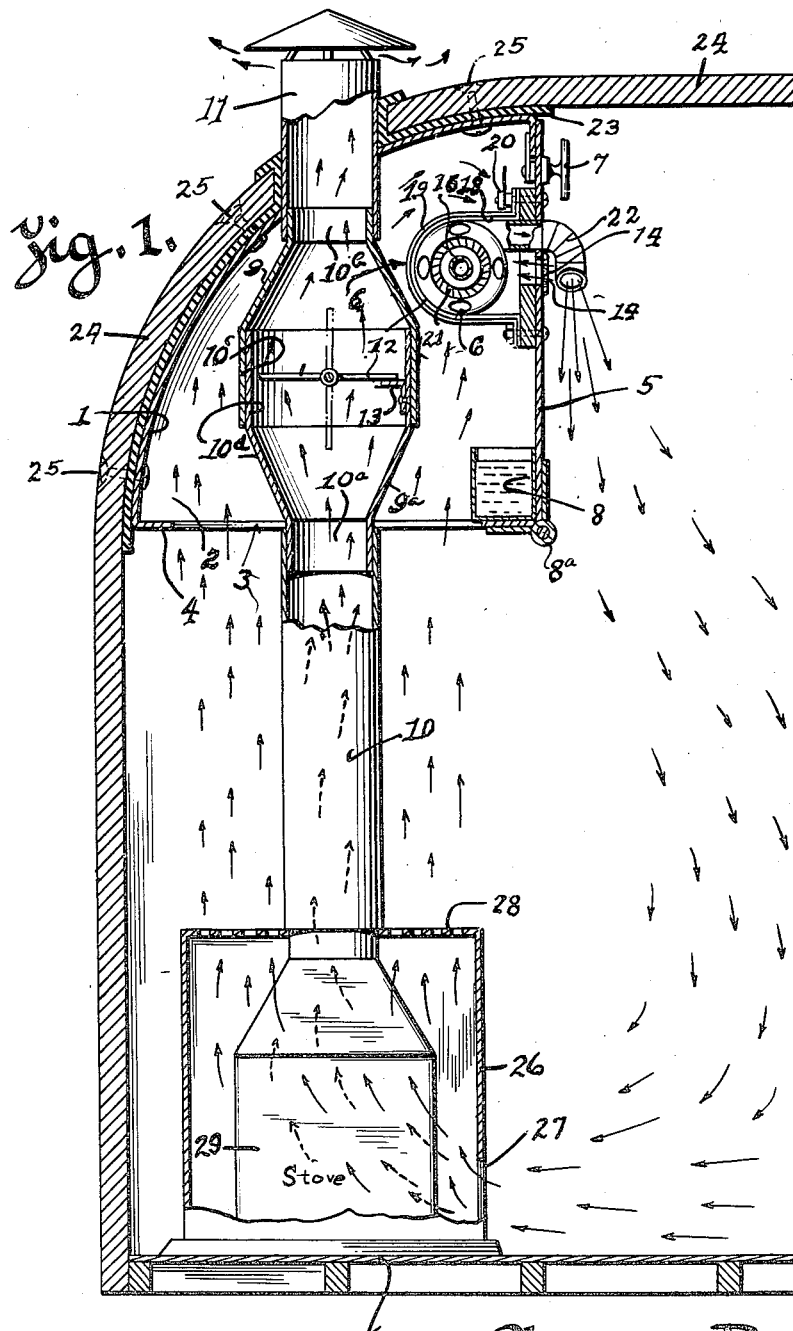

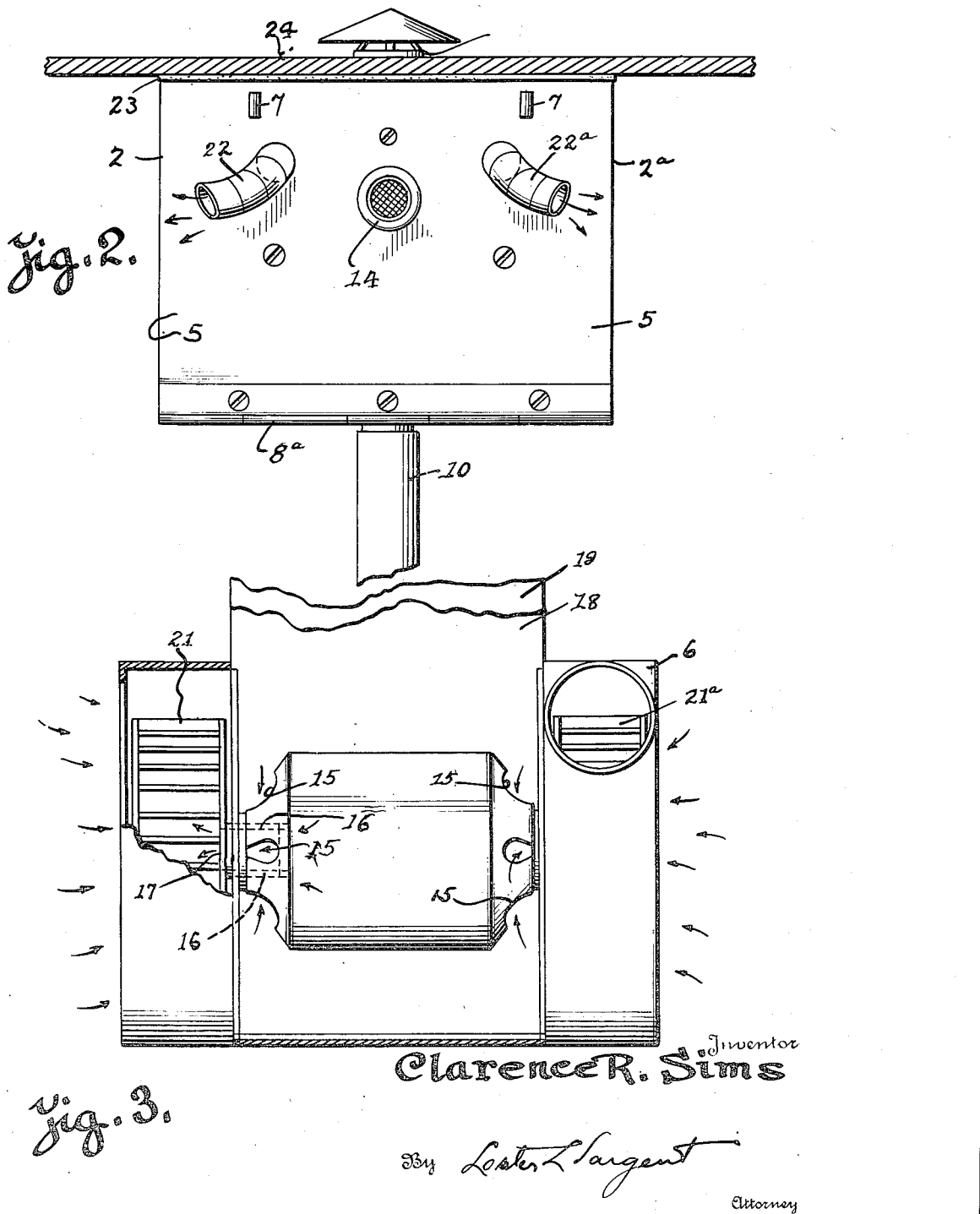

2,272,356

UNITED STATES PATENT OFFICE 2,272,356

TRAILER HEAT AND AIR CONDITIONING DEVICE

Clarence R. Sims, Elkhart, Ind., assignor to Therm-U-lator Corporation, Elkhart, Ind., a corporation of Indiana Application April 19, 1941, Serial No. 389,457

7 Claims. (Cl. 237—55)

The object of my invention is to provide an improvement in a trailer heat and air-conditioning device.

It is well known among trailer users that with the ordinary heating elements commonly employed in trailers, usually consisting of nothing more than a small coal or oil burning stove, the heat is not diffused equally, thereby permitting the heat to accumulate near the ceiling, while the floor and lower portion of the trailer is left cold. In addition to being uncomfortable, this condition is very unhealthy and when the trailer is in use, the condition is aggravated to the extent of causing "sweating" or trailer sweat, due to inefficient or inadequate circulation and difference of temperature between floor and ceiling of the trailer.

My object is to provide means, adaptable to present types of heating devices, wherein the warm air is collected from said heating device and forced toward both ends of the trailer and downward toward the floor of same by means of a suitable motor-driven fan and thus prevent sweating and provide a more even distribution of heat.

A further object is to conserve fuel by providing a more efficient and effective distribution of heat.

Finally, my object is to provide means that may be installed in the curved or semi-circular section of the trailer and immediately above the stove or other heating unit as illustrated in the accompnying drawings, in which—

Figure 1 is a vertical section through the trailer and through my device, portions of the air-conditioning device being shown in side elevation;

Fig. 2 is a view partly in front plan and partly in section, showing the motor-driven blower or suction fan employed and Fig. 3 is a front elevation of the blower motor, portions of the figure being broken away and shown in section.

Like characters of reference designate like parts in each of the views.

Referring to the drawings, I provide a suitable housing 1 of quarter-circular contour, mounted in the curved side 24 of a trailer, as shown in Fig. 1. The housing 1 has sides 2 and 2a, and a large opening 3 in the bottom 4. The housing 1 also has a hinged door 5 hinged at 8a. On the inner side of door 5 a blower fan unit 6 is mounted, as shown in Fig. 1. A suitable latch 7 holds the door closed. A removable humidifier or water-pan 8 is located just within the door 5.

Positioned in housing 1, is a heat drum, consisting of frusto-conical sections 9 and 9a with cylindrical portions 10 and 10a, which telescope each other, and cylindrical portions 10c and 10d. Reduced end 10a connects to the stove pipe 10 while end 10b connects to the chimney 11. Within the heat drum is located a conventional stove-pipe damper 12 which may be operated in the conventional manner. This damper must have ample clearance between it and the drum so as to provide for adequate exhaust of fumes even when the damper is closed. A suitable stop 13 abuts against the damper when it is in its closed position.

The blower motor 6 is cooled by air drawn in through the screened inlet 14, thence into the openings 15 in the motor 6 and into the hollow shaft 16 and out through passage or opening 17, (Fig. 2) into central or suction area of blower, which is preferably of the "squirrel cage" variety and duplex fan type as shown. The inlet 14 (Fig. 2) may be connected with the exterior of the trailer by means of flexible metallic tubing if desired.

The blower unit is rigidly mounted on the interior of the door 5 and enclosed in a suitably U-shaped strip of asbestos 18, which is backed with a suitable U-shaped strip of sheet metal 19 and clamped in place with the thumb nut 20. These combined asbestos and metal strips also serve to insulate the motor from the direct heat of the drum 9, and provide an enclosed chamber around the motor through which cool air may be drawn by the suction of the fans 21 and 21a, as shown in Figs. 1 and 3. The thumb nut 20 may be removed, thus releasing the strips 18 and 19 to permit access to the motor for lubricating or inspection.

Universal jointed adjustable conduits 22 and 22a are provided at each exhaust opening of the blower unit, as shown in Fig. 1 and may be adjusted to any desired angle to direct or deflect the heat to any point forward, rearward or downward.

A suitable asbestos pad 23 is provided between the case 1 and the wood section of trailer 24, and the entire unit is held in place by means of screws 25.

My invention is designed to fit into the chimney line of any conventional oil or coal heating device, and to fit the quarter circular section of the conventional trailer structure (which is the prevailing construction), where it is out of the way and where it will operate with maximum efficiency.

In operation, cold air enters the heat casing 26 at opening 27 near the floor, passed through opening 29, and flows upwardly around stove 29 and through the top grill 28 of heating unit 26 and into the large opening 3 in the bottom of the case or housing 1. It is further heated in housing 1 by the radiation from the drums 9, 9a. From thence it is drawn by the suction of the blower fans 21, 21a, and forced out through the jointed adjustable conduits 22, 22a in any desired direction, moisture being drawn along with the warm air from the water in the water pan or humidifier 8.

Because the blower can force the warm air from the case 1 as fast as it enters same and direct it downward towards the floor at each end of the trailer, thus maintaining maximum circulation, less fuel is required to maintain a comfortable and healthy condition.

I have constructed and operated the above described invention in a trailer with no floor insulation and maintained a temperature on the floor of 60 degrees F. while the temperature at the ceiling was 70 degrees and an out-door temperature of zero, whereas, at the same time, or within two hours and with my invention shut off, the floor temperature was below freezing while the ceiling temperature stood at 70.

While the blower unit shown at Fig. 3 and in Fig. 1 is preferred, any suitable type of blower unit may be employed. The curved or arcuate shape of the casing or housing 1, as shown, is very important, because it fits snugly into the curvature of the trailer construction, making a neat, compact and unobtrusive unit which aligns with overhead cabinet construction and also because the door 5 may be opened and allowed to hang down, thereby permitting warm air from the heater element to flow upward and out through said door after passing around the heater drum 9—9a, which increases the radiation area. This procedure is employed while trailer is in use and when current to operate the motor is not available.

What I claim is:

1. In a trailer heat and air conditioning device, the combination of a quadrant-shaped housing mounted in the curved side of a trailer, said housing having a large opening in the bottom thereof for the intake of heated air, and having a vertical hinged door, a latch for said door, a container of water mounted in said housing, a blower fan also mounted in said housing and having an adjustable conduit for directing the heated air to the portion of the trailer desired, a screened inlet for admission of cooling air to the blower unit, a heating element mounted on the floor of the trailer, a casing enclosing said heating element, said casing having an opening near the bottom thereof and having the top of the casing perforated and disposed directly beneath the opening in the bottom of the quadrant-shaped housing, a hot air conduit extending from the heating element to the quadrant-shaped housing, a heat drum within the quadrant-shaped housing and connected with the aforesaid heat conduit, a chimney connecting with said heat drum, a damper mounted in the heat drum, and a stop element to limit the movement of the said damper.

2. In a trailer heat and air conditioning device, the combination of a quadrant-shaped housing mounted in the curved side of a trailer, said housing having a large opening in the bottom thereof for the intake of heated air, a blower fan also mounted in said housing and having an adjustable conduit for directing the heated air to the portion of the trailer desired, a screened inlet for admission of cooling air to the blower unit, a heating element mounted on the floor of the trailer, a casing enclosing said heating element, said casing having an opening near the bottom thereof and having the top of the casing perforated and disposed directly beneath the opening in the bottom of the quadrant-shaped casing, a hot air conduit extending from the heating element to the quadrant-shaped housing, a heat drum within the quadrant-shaped housing and connected with the aforesaid heat conduit, a chimney connecting with said heat drum, a damper mounted in the heat drum, and a stop element to limit the movement of the said damper.

3. In a trailer heat and air-conditioning device, the combination of a quadrant-shaped housing mounted in the curved side of a trailer, said housing having a large opening in the bottom thereof, blower fans also mounted in said housing and having adjustable conduits for directing the heated air to the portion of the trailer desired, a screened inlet for admission of cooling air to the blower unit, a heating element mounted on the floor of the trailer, a casing enclosing said heating element, said casing having an opening near the bottom thereof and having the top of the casing perforated and disposed directly beneath the opening in the bottom of the quadrant-shaped housing, a hot air conduit extending from the heating element to the quadrant-shaped housing, a heat drum within the quadrant-shaped housing and connected with the aforesaid heat conduit, a chimney connecting with said heat drum, a damper mounted in the heat drum, and a stop element to limit the movement of the said damper.

4. In a trailer heat and air-conditioning device, the combination of a quadrant-shaped housing mounted in the curved side of a trailer, said housing having a large opening in the bottom thereof, and having a vertical hinged door, a latch for said door, a container of water mounted in said housing, blower fans also mounted in said casing and having conduits for directing the heated air to the portion of the trailer desired, a screened inlet for admission of cooling air to the blower unit, a heating element mounted on the floor of the trailer, a casing enclosing said heating element, said casing having an opening near the bottom thereof, and having the top of the casing perforated and disposed directly beneath the opening in the bottom of the quadrant-shaped housing, a hot air conduit extending from the heating element to the quadrant-shaped housing, a heat drum within the quadrant-shaped housing and connected with the aforesaid heat conduit, a chimney connecting with said heat drum, a damper mounted in the heat drum, and a stop element to limit the movement of the said damper.

5. In a trailer heat and air-conditioning device, the combination of a quadrant-shaped housing mounted in the curved side of a trailer, said housing having a large opening in the bottom thereof, and having a vertical hinged door, a latch for said door, a container of water mounted in said housing, a blower fan also mounted in said casing housing and having an adjustable conduit for directing the heated air to the portion of the trailer desired, a screened inlet for admission of cooling air to the blower unit, a heating element mounted on the floor of the trailer, a casing enclosing said heating element, said casing having an opening near the bottom thereof and having the top of the casing perforated and disposed directly beneath the opening in the bottom of the quadrant-shaped housing, a hot air conduit extending from the heating element to the quadrant-shaped housing, a heat drum within the quadrant-shaped housing and connected with the aforesaid heat conduit, said heat drum consisting of a pair of connected frusto-conical sections, one of said sections being connected to the hot air conduit, and a chimney connecting with the other section of said heat drum, a damper mounted in the heat drum, and a stop element to limit the movement of the said damper.

6. In a trailer heat and air-conditioning device, the combination of a quadrant-shaped housing mounted in the curved side of a trailer, said housing having a large opening in the bottom thereof, and having a vertical hinged door, a latch for said door, a container of water mounted in said housing, a blower fan also mounted in said housing and having an adjustable conduit for directing the heated air to the portion of the trailer desired, a heating element mounted on the floor of the trailer, a casing enclosing said heating element, said casing having an opening near the bottom thereof and having the top of the housing perforated and disposed directly beneath the opening in the bottom of the quadrant-shaped casing, and a heat conduit in connection with the aforesaid heating element, a heat drum consisting of a pair of connected frusto-conical sections, one of said sections being connected to the hot air conduit, and a chimney connecting with the other section of said heat drum.

7. In a trailer heat and air-conditioning device, the combination of a quadrant-shaped housing mounted in the curved side of a trailer, said housing having a large opening in the bottom thereof, a blower fan also mounted in said casing and having an adjustable conduit for directing the heated air to the portion of the trailer desired, a screened inlet for admission of cooling air to the blower unit, a heating element mounted on the floor of the trailer, a casing enclosing said heating element, said casing having an opening near the bottom thereof and having the top of the casing perforated and disposed directly beneath the opening in the bottom of the quadrant-shaped housing, a hot air conduit extending from the heating element to the quadrant-shaped housing, a heat drum within the quadrant-shaped housing and connected with the aforesaid heat conduit, said heat drum consisting of a pair of connected frusto-conical sections, one of said sections being connected to the hot air conduit, and a chimney connecting with the other section of said heat drum, a damper mounted in the heat drum, and a stop element to limit the movement of the said damper.

CLARENCE R. SIMS.